Jan. 8, 1929.

R. M. CRAIG 1,698,220

DISPLAY APPARATUS

Original Filed Dec. 29, 1925    3 Sheets-Sheet 1

Inventor
R. M. Craig.
By Lacey & Lacey, Attorneys

Jan. 8, 1929.

R. M. CRAIG 1,698,220

DISPLAY APPARATUS

Original Filed Dec. 29, 1925   3 Sheets-Sheet 3

Inventor
R. M. Craig.
By Lacey & Lacey, Attorneys

Patented Jan. 8, 1929.

1,698,220

UNITED STATES PATENT OFFICE.

RICHARD MORGAN CRAIG, OF SAN ANTONIO, TEXAS.

DISPLAY APPARATUS.

Application filed December 29, 1925, Serial No. 78,245. Renewed May 4, 1928.

This invention relates to novel advertising and display apparatus and has as its general object to provide a novel method of and apparatus for displaying not only advertising matter but also the goods or commodities to which such matter relates.

It is common practice to make use of signboards in advertising merchandise such as furniture, clothing, automobiles, etc., and to represent upon the display surface of such a board a picture of the articles of furniture, images of persons attired in the clothing to be advertised, a representation of the automobile advertised, etc., but such signboards attract little attention and do not hold forth any inducement to the observer to observe the same by more than a casual glance. Furthermore, such sign boards are ordinarily illuminated continuously under white light rays and it is merely this simple illumination by which attention is attracted to them at night. It is a well recognized fact that displays which embody the factors of colored light illumination, animation, and material representation of objects, attract and hold the attention of an observer to a far greater degree than displays which are lacking in these respects. Therefore, the present invention has as one of its objects to provide a display apparatus which, for example, may be in the nature of a sign board and which apparatus will embody, in its operation, the factors above named, so that an observer will have his attention drawn to the display because of the presence of the colored light illumination, animation, and actual display of the merchandise advertised, and will be induced to more carefully scrutinize the display than if these factors were not present.

More specifically, the invention has as its object to provide a sign board constituting a display surface upon which advertising matter may be represented in an attractive form and so illuminated as to attract and hold the attention of an observer, the board further including a compartment in which the merchandise to which the advertising matter relates, is arranged in an attractive manner for observation, means being provided whereby, under certain conditions, the display of merchandise within the compartment will be concealed from view and, under other conditions, will be attractively displayed to view, so that the sign will possess the factor of mystification as well as the other factors heretofore referred to.

Figure 1:
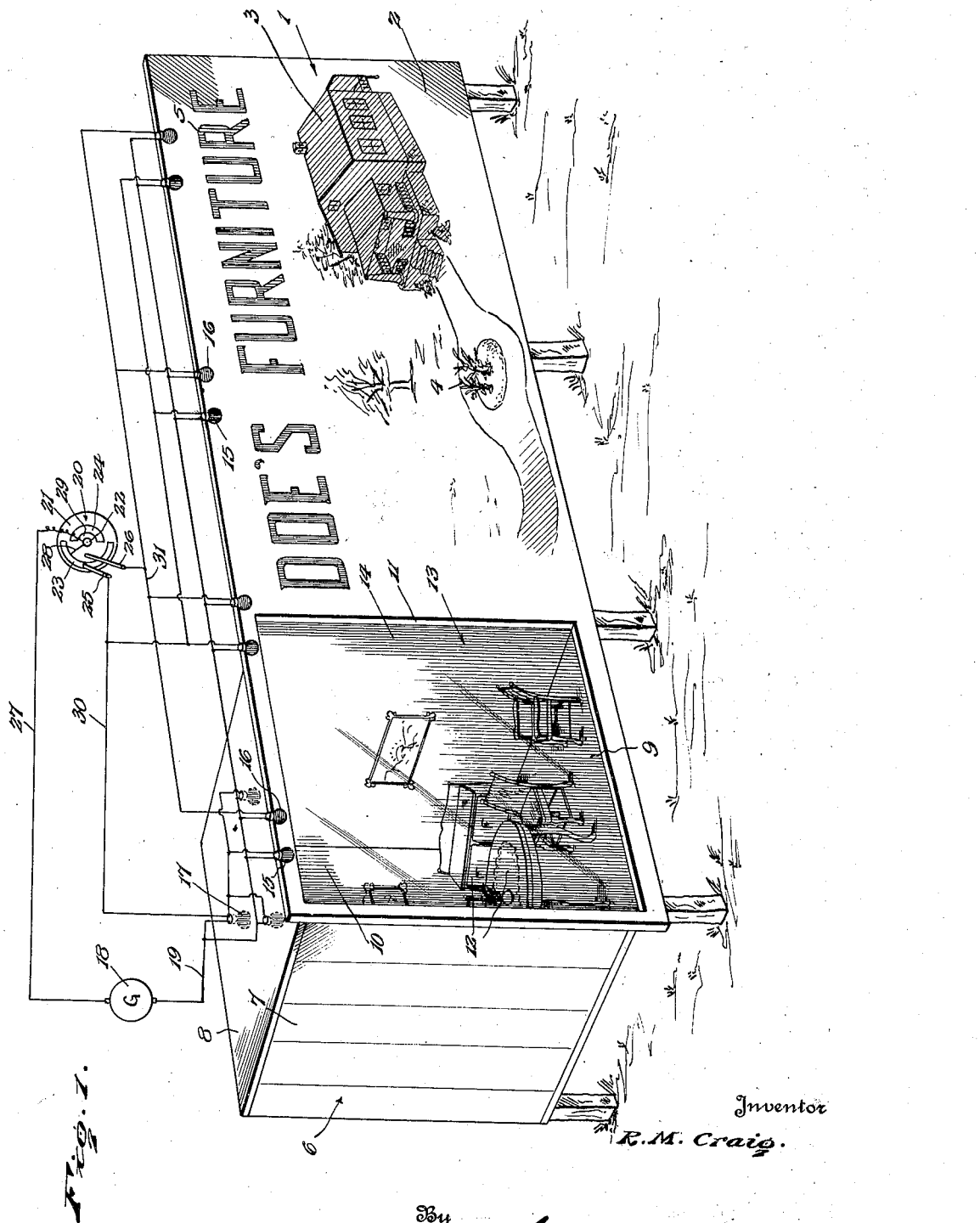
Figure 1 is a perspective view illustrating one embodiment of the invention.

In the embodiment of the invention illustrated in Figure 1 of the drawings, the numeral 1 indicates in general a sign board or any other suitable surface upon which advertising matter may be painted or otherwise represented, and the surface of the board has applied to it any suitable paint or other pigment, in this instance of a dark neutral color such for example as brown, so as to provide a background which is indicated by the numeral 2. Upon the surface of the board there is painted, for example, in green, or blue, or blue-green, a bungalow or other place of residence, indicated by the numeral 3, and a suitable landscape representation, indicated by the numeral 4, which is likewise in green. Upon another portion of the display surface, as for example along the upper portion thereof, there may be painted any suitable advertising matter indicated by the numeral 5, and this matter will preferably be painted in red.

The present invention contemplates, as previously intimated, the actual display of material articles of merchandise in connection with advertising matter relating thereto, and the manner in which the material articles are displayed, in connection with the advertising display surface above described, will now be pointed out. The advertising display surface occupies either a major or a minor portion of the area of the sign board 1 and, in the illustrated embodiment of the invention, as displayed by Figure 1 of the drawings, a compartment 6 is constructed at the rear of the sign board and has closed sides 7, a top 8, a bottom 9, and a closed back 10. This compartment is open at its front and its open front is secured to the rear side of the sign board in substantial registration with a rectangular opening 11 formed in said sign board. Interiorly, the compartment 6 may be finished to represent the interior of a room, and the walls may be suitably decorated so as to enhance the advertising qualities of the display as a whole, articles of furniture, indicated by the numeral 12, being arranged within the compartment 6, as they would be arranged in the room of the house. In the embodiment illustrated, the advertising display surface is located at one side of the compartment 6 but it will be understood that the compartment might be located midway between the ends of the sign board or at any other intermediate point in the length thereof and the remainder of the area of the board employed as an advertising-matter display surface. In carrying out the invention, and for a purpose to be presently made clear, a light ray transmitting medium, indicated in general by the numeral 13, is arranged within the opening 11 in the sign board 1, and this medium may comprise a pane 14 of colored glass, a sheet or pane of colored celluloid or other similar transparent material, a sheet of wire gauze painted a suitable color, or a sheet or screen, or pane of any other material found suitable for the purpose and which will be sufficiently transparent to permit of the display within the compartment 6, being viewed in daylight as well as, under other conditions to be presently recited, at night.

The invention contemplates the display of the display surface as well as the material objects within the compartment 6, under light rays having such selected and predetermined color values that certain novel effects may be obtained as will presently be explained, and with this end in view, in the specific example illustrated, red light bulbs 15 and blue light bulbs 16 are arranged preferably at the top of the sign board, the bulbs 15 and 16 preferably being arranged in sets or pairs or being otherwise symmetrically arranged so that when the bulbs 15 are lighted, for example, the entire surface of the sign board, including the pane or sheet 14, will be flooded with red light and, on the other hand, when the blue light bulbs 16 are lighted, the entire surface of the board will be flooded with blue light rays. Other red or white light bulbs, indicated by the numeral 17, are arranged in any appropriate manner, within the compartment 6. The numeral 18 indicates a source of current supply and the numeral 19 a conductor wire which leads from one side thereof and is electrically connected by suitable branch wires, with one terminal of the socket for each of the bulbs 15, 16, and 17. The numeral 20 indicates in general an electric flasher or other suitable circuit closing device which may, for example, comprise a disc 21 of insulating material supported for rotation by a shaft 22, and having arcuate contact strips 23 and 24 mounted upon its face concentric to the shaft. Brushes 25 and 26 are supported in position to respectively contact the contact strips 23 and 24, in the rotation of the disc 21. A conductor wire 27 leads from the other side of the source of current supply 18 and is connected to the shaft 22, and wires 28 and 29 extend from the shaft to the contact strips 23 and 24 respectively. A conductor wire 30 is connected with the brush 25 and has branches connected to the other terminals of the sockets for all of the red light bulbs 15 and 17. A conductor wire 31 leads from the brush 26 and has branches connected to the other terminals of the sockets for all of the blue light bulbs 16. At this point it will be evident that in the rotation of the disc 21, the circuit will be closed alternately through all of the red light bulbs 15 and 17 and all of the blue light bulbs 16, so that the entire sign board will at one moment be flooded with red light and the compartment 6 will be interiorly illuminated with red light, and at the next moment the entire board will be flooded with blue light rays.

It will be observed from the foregoing that a portion of the advertising matter upon the display surface of the signboard is represented in one pigment color, as for example green, and that the other matter is represented upon said surface in a contrasting pigment color, for example red. It will also be observed that the sources of illumination are of a character to flood the signboard with light rays of contrasting colors corresponding substantially to the pigment colors in which the advertising matter is represented. The pane of glass 14 or other light ray transmitting medium will, in this instance, be red in color and transparent under white light to a degree to render the interior of the compartment visible. It will also be evident from the foregoing that the display surface of the signboard has a dark neutral background which may, as previously stated, be brown. By "contrasting colors" I mean colors which are substantially complementary to each other and by a "neutral color" I mean a color which will not materially change under colored light rays or, in other words, such colors as display no decided color characteristics such as relate to primary colors. Therefore, contrasting pigment colors other than red and green may be employed in representing the advertising matter, and the pane 14 may be of any one of a number of the distinctive colors of the spectrum, and likewise, the sources of illumination may be of such character as to flood the sign board with light rays other than red and blue or red and blue-green, whichever may be employed in the specific embodiment of the invention illustrated. There are many neutral pigment colors which may be employed as the background for the representations which are painted or otherwise displayed in the contrasting pigment colors, such for example as black, dark gray, Indian red, etc.

In the operation of the display apparatus, and when the circuit is closed through the blue light bulbs 16, the red light ray transmitting medium or pane 14 will become opaque and the advertising matter 5 will be obliterated, whereas the representation 3 of the house and the representation 4 of the ground upon which it stands will be vividly presented to the view of the observer against a dark background. At this point it is important to remark that it is due to the contrast between the dark background and the representations 3 and 4 which are in green and are displayed, at this moment, in the operation of the apparatus, under green light, that these representations will stand out with startling vividness. In this period of operation of the display apparatus, the interior of the compartment 6 will be entirely obscured. In the next period of operation of the apparatus, the entire sign board will be flooded with red light and the interior of the compartment 6 will likewise be illuminated by the red or white light bulbs 17 so that the representations 3 and 4 will be totally obliterated and the advertising matter 5 will apparently stand out vividly, apparently substantially white against a very dark background this effect being produced due to the contrast between the background and display matter. At the same time, the light ray transmitting medium or pane 14 will become entirely transparent, and all of the articles within the compartment 6 will be displayed to the view of the observer. The red light bulbs 17 are employed as a matter of choice inasmuch as they serve to brilliantly illuminate the interior of the compartment 6, but a sufficient number of the bulbs 15 might be employed in proximity to the opening 11 in the sign board 1, to properly illuminate the interior of the said compartment. Likewise, clear bulbs capable of transmitting white light rays untinted, might be substituted for the bulbs 17. In any event, the light ray transmitting medium 14 becomes entirely transparent under red light rays provided it, in itself, is red in color, and opaque under rays of a contrasting color such for example as blue, blue-green or green. As previously stated, various contrasting colors may be employed and, therefore, the colors referred to above are to be considered merely as illustrative of one application of the principles of the invention.

In the specific embodiment of the invention shown in Figure 1 of the drawings, the attention of the observer is first invited to an artistically displayed picture of an attractive home, and then to attractive furnishings which might well be used in such a home, and, at this latter time, has also presented to his view the name of the dealer, for example, or any other advertising matter which may be appropriate. This, of course, is merely representative of one application of the principles of the invention and it will be understood that various display matters may be depicted upon the display surface of the sign board and various kinds of merchandise may be displayed within the compartment 3 without in any way departing from the spirit of the invention.

Figure 2:
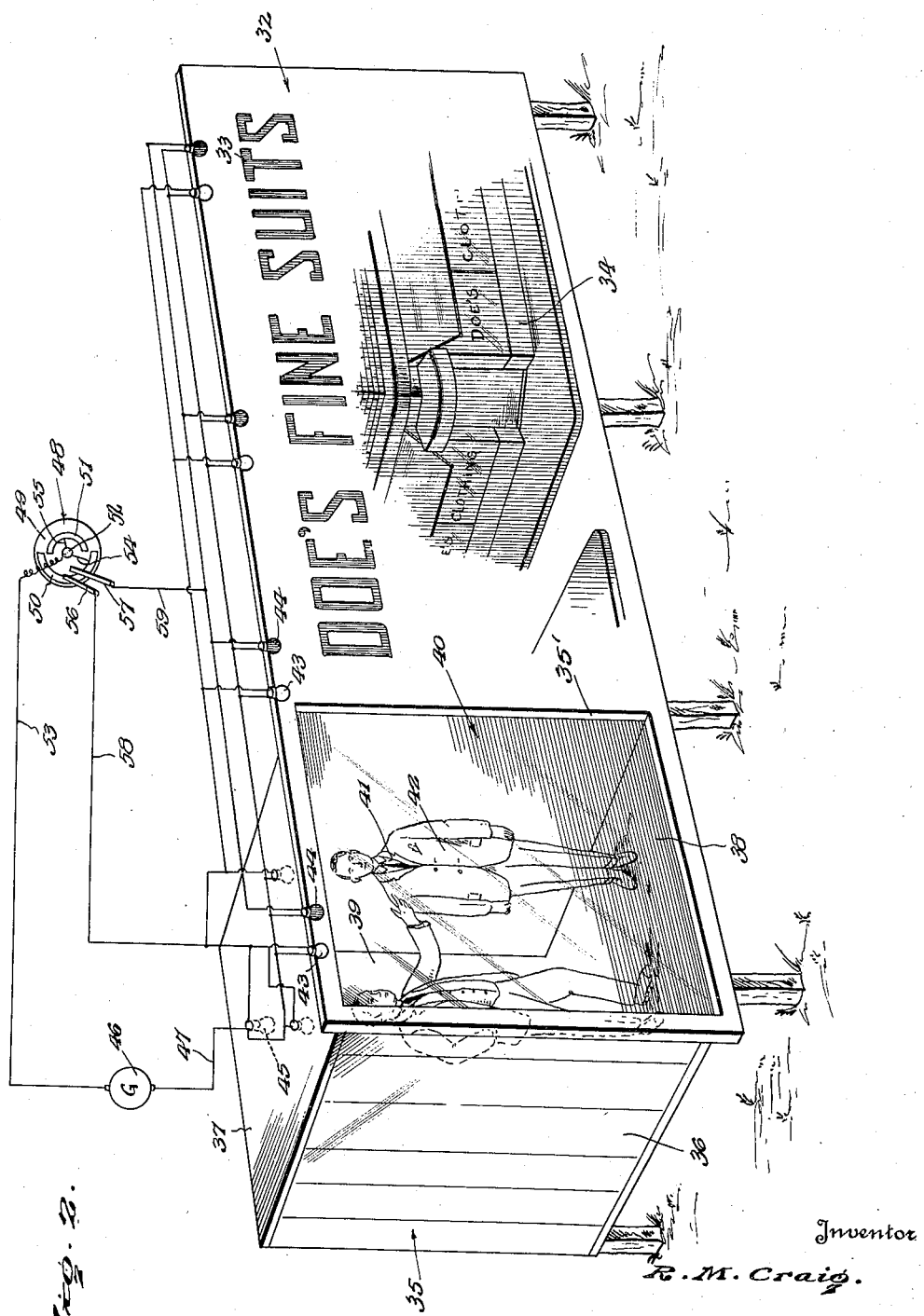
Figure 2 is a similar view illustrating another embodiment of the invention.

Figure 2 of the drawings illustrates another application of the principles of the invention and in this figure the numeral 32 indicates in general a sign board which has advertising matter, indicated at 33, painted or otherwise represented thereon, in red, and other display matter, indicated by the numeral 34, represented also in red, the latter display matter being, for example, the representation of a clothing store. The representations 33 and 34 are painted or otherwise depicted upon a light neutral background, or a pure white background and, as in the preceding embodiment of the invention, the advertising matter and display matter may be arranged in any desired manner upon the display surface of the board.

The board 32 is formed with an opening 35', in this instance located at one end of the board and, therefore, at one side of the display and advertising matter, and a compartment 35 comprising closed sides 36, a top 37, a bottom 38, and a back 39, is constructed at the rear of the said end of the sign board with its open front substantially in registration with the opening 34 in the board, a pane of glass or other light ray transmitting material such as celluloid, wire gauze, or the like, indicated by the numeral 40, being arranged within the open front of the compartment 35 and being preferably of a color contrasting with the color of the advertising and display matters 33 and 34, as for example, blue or blue-green. In this particular instance, the merchandise to be advertised and displayed is clothing, and, therefore, one or more clothing dummies, indicated by the numeral 41, are arranged in any suitable manner within the compartment 35 and are attired in garments indicated by the numeral 42. The light ray transmitting material 40 will be sufficiently transparent to permit of the display comprising the clothed dummies, being viewed by daylight and, of course, the advertising and display matters 33 and 34 will likewise be clearly visible by daylight.

The numeral 43 indicates clear electric light bulbs which are arranged preferably along the top of the sign board, and the numeral 44 indicates red electric light bulbs similarly arranged and preferably each positioned beside a respective one of the bulbs 43. Other clear light bulbs 45 are suitably arranged within the compartment 35. The numeral 46 indicates a source of current supply and the numeral 47 indicates a conductor wire leading from one side of the source of supply and connected by branch wires with one terminal of each of the sockets for the light bulbs 43, 44 and 45. The numeral 48 indicates in general any suitable flasher which may, for example, comprise a disc 49 of insulating material carrying arcuate contacts 50 and 51 upon its face, the disc being mounted upon a shaft 52 whereby it may be continuously rotated. A conductor wire 53 leads from the other side of the source of current supply 46 and is electrically connected with the shaft 52, and wires 54 and 55 establish electrical connection between the shaft and the contact strips 50 and 51 respectively. Brushes 56 and 57 are arranged in juxtaposition to the disc 49 and are so positioned as to respectively coact with the contact strips 50 and 51 in the rotation of the disc. A conductor wire 58 is led from the brush 56 and connected by branch wires with the other terminals of the sockets for the clear light bulbs 43 and 45, and a conductor wire 59 is led from the brush 57 and is connected by branches to the other terminals of the sockets for the red light bulbs 44. Therefore, as in the previously described embodiment of the invention, when the flasher 48 is in operation, the bulbs 44 will be supplied with current for a period of time and the bulbs 43 and 45 will next be supplied with current, so that the entire sign board is at one moment flooded with red light rays and at the next moment said board and the interior of the compartment 35 are flooded with white light rays. When the red light bulbs are lighted, the advertising matter 33 and display matter 34, which is depicted in red upon the display surface of the sign board, will apparently be obliterated due to the fact that there is, at such time, no visible contrast between the display surface and the matter thereon. Inasmuch as the light ray transmitting pane or other medium 40 is of a contrasting color, the same will be rendered opaque so that the interior of the compartment 35 will be invisible. On the other hand, when the white light bulbs 43 and 45 are lighted, the display surface of the sign board will be flooded with white light rays and the advertising matter 33 and display matter 34 will be brought out distinctly in red against a white background, and, at the same time, the interior of the compartment 35 will be flooded with white light rays so that the objects, namely the clothed dummies 41, will be clearly displayed to view and in marked contrast with the red display matter or advertising upon the display surface of the sign board.

In the embodiment of the invention just described, it will be observed that spectral light rays but of a single distinctive color are utilized in illuminating the display surface of the sign board, in combination with white light rays, which is a composite of all of the spectral colors, and it will be evident that in this case, as in the preceding embodiment, the advertising displayed may be arranged in any desired manner and the compartment 35 may be located at some intermediate point in the length of the board rather than at one end thereof, if found desirable or expedient.

It will be understood, of course, that instead of applying pigment direct to a sign board, lithographs may be employed printed in inks of suitable colors, and, furthermore, the compartment for displaying material objects might be associated with any suitable display surface other than a signboard.

Figure 3:
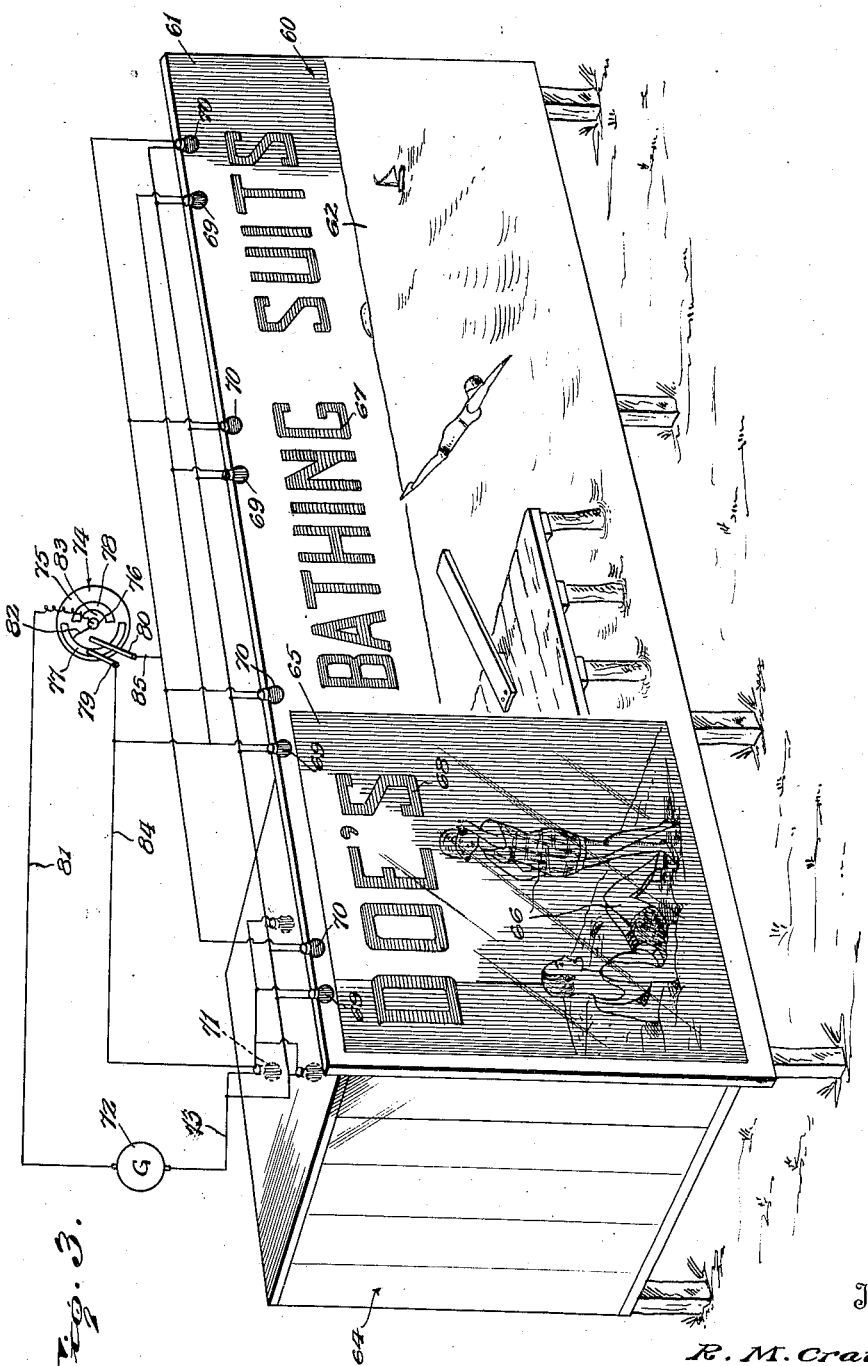
Figure 3 is a view similar to Figure 2, illustrating another embodiment of the invention.

Figure 3 of the drawing illustrates another interesting embodiment of the principles of the invention and in this figure, the display surface is indicated in general by the numeral 60 and is provided with a red background indicated by the numeral 61, the display surface having represented thereon, in white or some other light neutral color, pictorial matter such for example as a seashore scene, indicated by the numeral 62 and presenting a diving girl and such other pictorial representations as may be found appropriate. The compartment corresponding to the compartments of the previously described forms is indicated in general by the numeral 64 and is closed at its front by a transparent pane or screen, or other light ray transmitting medium 65, which is, in the illustrated embodiment, red in color. Dummies 66 may be arranged within the compartment, in bathing costume, and, assuming that the display is to be employed in advertising the goods of a dealer in bathing suits, the costumes in which the dummies are dressed will be such costumes as are sold by the dealer. The dummies and the costumes thereon may be represented in natural colors and the dummies may be arranged in various postures within the compartment. In this particular instance, the pictorial representation upon the display surface occupies the lowermost portion of the surface and the dark background 61 occupies the upper portion of the surface, and within the area of this background there are printed, preferably in blue, in accordance with the illustrated embodiment of the invention, one or more words of advertising matter relating to the merchant's business, these words being indicated by the numeral 67. One or more words, likewise constituting advertising matter, and indicated by the numeral 68 and likewise represented in blue pigment, are displayed upon the upper portion of the light ray transmitting medium 65 in alinement with the words or other matter 67 and in such position as to not obscure the dummies or figure representations which are located within the compartment 64.

In this embodiment, red light bulbs 69 and blue light bulbs 70 are preferably arranged in sets or pairs at the top of the signboard or are otherwise symmetrically arranged so that when the red light bulbs, for example, are lighted, the entire surface of the signboard including the light ray transmitting pane or screen 65, will be flooded with red light and, on the other hand, when the blue light bulbs 70 are lighted, these bulbs will illuminate the entire display surface with blue light rays. Other red light bulbs, indicated by the numeral 71, are arranged in any appropriate manner within the compartment 64. The numeral 72 indicates a source of current supply and the numeral 73 indicates a conductor wire which leads from one side of the source of current supply and is electrically connected by suitable branch wires with one terminal of the socket for each of the bulbs 69, 70 and 71. The numeral 74 indicates in general an automatic electric flasher or other suitable circuit closing device which may comprise a disc 75 of insulating material supported for rotation by a shaft 76 and having contact strips 77 and 78 mounted upon its face concentric to the shaft. Brushes 79 and 80 are supported in position to respectively contact the strips 77 and 78 in the rotation of the disc 75, and a conductor wire 81 leads from the other side of the source of current supply to the said shaft 76, wires 82 and 83 being led respectively from the strips 77 and 78 to said shaft 76. A conductor wire 84 is connected with the brush 79 and has branches connected to the other terminals of the sockets for all of the red light bulbs 69 and 71. A conductor wire 85 leads from the brush 80 and has branches connected to the other terminals of the sockets for all of the blue light bulbs 70. At this point it will be understood that in the operation of the flasher, the circuit will be closed alternately through all of the red light bulbs 69 and 71 and all of the blue light bulbs 70, so that the entire display surface will be at one moment flooded with red light rays as also the interior of the compartment 64, and, at the next moment, the entire display surface will be flooded with blue light rays, including the pane or other light ray transmitting medium 65.

It will now be understood that when the display surface is flooded with blue light rays, the scenic representation 62 will be displayed to view, the red background 61 will appear substantially black as will also the pane or other light ray transmitting medium 65, and the worded or other advertising matter 67 and 68 will appear, by contrast, seemingly a brilliant white against the opaque surface 65 and background 61, the interior of the compartment 64 being at such time completely obscured from view. On the other hand, when the display surface is flooded with red light rays, the pictorial representation 62 will be visible, the background 61 will appear white, the worded advertising matter 67 and 68 will appear substantially black, and the light ray transmitting medium 65 will be rendered completely transparent and the interior of the compartment 64 will be illuminated so as to display the material objects arranged therein. At this point it will be understood that if desired, the bulbs 71 may be clear electric light bulbs so as to deliver white light rays.

It will be observed that in this last described embodiment of the invention, the entire display surface, including the light ray transmitting medium 65, is displayed by reflected light under the blue light illumination and that, under the red light illumination, the display surface proper is displayed by reflected light and the interior of the compartment 64 by transmitted light.

Having thus described the invention, what I claim is:

1. Display apparatus comprising a display surface bearing matter to be displayed represented in a distinctive pigment color, a compartment having an open front presented at said surface, a material object within the compartment, to be displayed, means for successively illuminating the display surface with light rays having different color characteristics, one capable of absorbing said matter and the other capable of displaying the same, and a transparent light ray transmitting medium at the open front of the compartment of a color contrasting with the color of the rays first mentioned.

2. Display apparatus comprising a display surface bearing matter to be displayed represented in a distinctive pigment color, a compartment having an open front presented at said surface, a material object within the compartment, to be displayed, means for successively illuminating the display surface with light rays having different color characteristics, one capable of absorbing said matter and the other capable of displaying the same, and a transparent light ray transmitting medium at the open front of the compartment of a color contrasting with the color of the rays first mentioned, the said illuminating means being also arranged to interiorly illuminate the said compartment with light rays corresponding in color to the second mentioned rays.

3. Display apparatus comprising a display surface bearing matter to be displayed represented in a distinctive pigment color, a compartment having an open front presented at said surface, a material object within the compartment, to be displayed, means for successively illuminating the display surface with light rays having different color characteristics, one capable of absorbing said matter and the other capable of displaying the same, and a transparent light ray transmitting medium at the open front of the compartment of a color contrasting with the color of the rays first mentioned, the said illuminating means being also arranged to interiorly illuminate the said compartment with light rays corresponding in color to the second mentioned rays and simultaneously with the illumination of the display surface with the said second mentioned rays.

4. Display apparatus comprising a display surface bearing matters to be displayed represented in contrasting pigment colors, a compartment having an open front presented at said surface, a material object, within the compartment, to be displayed, means for successively illuminating the display surface with light rays of contrasting spectral colors corresponding substantially to the said pigment colors, whereby to alternately display said matters individually by color absorption, and a transparent light ray transmitting medium at the open front of the compartment of a color corresponding substantially to one of said spectral colors.

5. Display apparatus comprising a display surface bearing matters to be displayed represented in contrasting pigment colors, a compartment having an open front presented at said surface, a material object, within the compartment, to be displayed, means for successively illuminating the display surface with light rays of contrasting spectral colors corresponding substantially to the said pigment colors, whereby to alternately display said matters individually by color absorption, and a transparent light ray transmitting medium at the open front of the compartment of a color corresponding substantially to one of said spectral colors, the said illuminating means including spectral light ray sources within the compartment active simultaneously with the light ray source for illuminating the display surface with light rays of one of the spectral colors, and corresponding in color to the color of the light ray transmitting medium.

6. Display apparatus comprising a display surface, a compartment having an open front presented at said surface, a substantially transparent light ray transmitting medium at the open front of the compartment of a distinctive pigment color, a material object within the compartment, to be displayed, the display surface bearing matter to be displayed represented in a distinctive pigment color, and means for alternately illuminating the display surface and the surface of the light ray transmitting medium with light rays of a spectral color such as to display the matter upon the display surface and render the light ray transmitting medium opaque to the vision of the observer, and with light rays of a spectral color such as to render the light ray transmitting medium transparent and to display to view the material object within the compartment and render the matter upon the display surface visible.

7. Display apparatus comprising a display surface bearing matter to be displayed represented in a distinctive pigment color, a compartment having an open front presented at said surface, a substantially transparent light ray transmitting medium at the open front of the compartment of a distinctive pigment color, a material object within the compartment, to be displayed, and means for alternately illuminating the display surface and the surface of the light ray transmitting medium with light rays of a spectral color contrasting with the color of the light ray transmitting medium and illuminating said surface and the interior of the compartment with light rays such as to display matter upon the display surface by reflected light and display the material object within the compartment by transmitted light rays.

8. Display apparatus comprising a display surface, a compartment having an open front presented at said surface, a substantially transparent light ray transmitting medium at the open front of the compartment, of a distinctive pigment color, a material object within the compartment, to be displayed, the said light ray transmitting medium and the display surface bearing matter to be displayed represented in a distinctive pigment color contrasting with the pigment color of the light ray transmitting medium, and means for alternately illuminating the display surface and the surface of the light ray transmitting medium with light rays of a spectral color contrasting with the pigment color which the light ray transmitting medium possesses and with light rays of a spectral color corresponding substantially to the color of the light ray transmitting medium.

9. Display apparatus comprising a display surface, a compartment having an open front presented at said surface, a substantially transparent light ray transmitting medium at the open front of the compartment, of a distinctive pigment color, a material object within the compartment, to be displayed, the said light ray transmitting medium and the display surface bearing matter to be displayed represented in a distinctive pigment color contrasting with the pigment color of the light ray transmitting medium, and means for alternately illuminating the display surface and the surface of the light ray transmitting medium with light rays of a spectral color contrasting with the pigment color which the light ray transmitting medium possesses and with light rays of a spectral color corresponding substantially to the color of the light ray transmitting medium and, during the last mentioned period of illumination, illuminating the interior of the compartment.

In testimony whereof I affix my signature.

RICHARD MORGAN CRAIG. [L. S.]